US009080865B2

(12) United States Patent
Lin

(10) Patent No.: US 9,080,865 B2
(45) Date of Patent: Jul. 14, 2015

(54) ORTHOGONALITY COMPENSATION METHOD FOR LENGTH MEASUREMENT DEVICE AND LENGTH MEASUREMENT DEVICE USING SAME

(71) Applicant: Shenzhen China Star Optoelectronics Technology Co., Ltd., Shenzhen, Guangdong (CN)

(72) Inventor: Yungyu Lin, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 60 days.

(21) Appl. No.: 13/814,747

(22) PCT Filed: Jan. 6, 2013

(86) PCT No.: PCT/CN2013/070087
§ 371 (c)(1),
(2) Date: Feb. 7, 2013

(87) PCT Pub. No.: WO2014/101311
PCT Pub. Date: Jul. 3, 2014

(65) Prior Publication Data
US 2014/0185038 A1 Jul. 3, 2014

(30) Foreign Application Priority Data

Dec. 27, 2012 (CN) .......................... 2012 1 0580354

(51) Int. Cl.
*G01B 11/00* (2006.01)
*G01B 11/27* (2006.01)
(Continued)

(52) U.S. Cl.
CPC ............ *G01B 11/272* (2013.01); *G01B 11/043* (2013.01); *G01B 21/045* (2013.01)

(58) Field of Classification Search
CPC ............ G03F 7/70716; G03F 7/70616; G03F 9/7088; G03F 9/7084; G02B 21/26; G05B 2219/49193; G01B 11/043; G01B 11/26; G01B 11/27; G01B 21/045; G01B 11/002
USPC ................. 356/399–401, 614–623, 500, 634; 702/95
See application file for complete search history.

(56) References Cited

U.S. PATENT DOCUMENTS 5,790,913 A * 8/1998 Roberts et al. ................ 396/546
6,134,007 A * 10/2000 Naraki et al. ................. 356/498
(Continued)

FOREIGN PATENT DOCUMENTS

CN 2619259 Y 6/2004
CN 1808055 A 7/2006
(Continued)

*Primary Examiner* — Hoa Pham
(74) *Attorney, Agent, or Firm* — Andrew C. Cheng

(57) ABSTRACT

The present invention provides an orthogonality compensation method for length measurement device, including: providing a measuring platform and a plurality of alignment marks, wherein the measuring platform comprises a chassis, a rectangular measuring table mounted on the chassis, an inspection microscope arranged above the measuring table, and a laser device mounted on the chassis and coupled to the inspection microscope; mounting the alignment marks on the measuring table and recording the coordinates of the alignment marks with respect to the coordinate system of the measuring table to provide reference coordinates; using the inspection microscope to read actual coordinates of the alignment marks with respect to the coordinate system of the measuring table and comparing the actual coordinates with the reference coordinates; and carrying out correction of coordinates if differences exist between the actual coordinates and the reference coordinates, so as to make the actual coordinates equal to the reference coordinates.

11 Claims, 8 Drawing Sheets

(51) Int. Cl.
*G01B 21/04* (2006.01)
*G01B 11/04* (2006.01)

(56) References Cited

U.S. PATENT DOCUMENTS

| | | | | |
|---|---|---|---|---|
| 6,678,038 | B2 * | 1/2004 | Binnard | 355/72 |
| 7,430,050 | B2 * | 9/2008 | Kamiyama et al. | 356/625 |
| 2002/0140296 | A1 * | 10/2002 | Ebihara | 310/12 |
| 2003/0158701 | A1 * | 8/2003 | Yasuda et al. | 702/179 |
| 2005/0151947 | A1 * | 7/2005 | Fujimaki | 355/55 |
| 2006/0023206 | A1 * | 2/2006 | Iwanaga et al. | 356/244 |
| 2006/0282179 | A1 * | 12/2006 | Mauro | 700/56 |
| 2007/0158401 | A1 * | 7/2007 | Katoh et al. | 235/375 |

FOREIGN PATENT DOCUMENTS

| | | |
|---|---|---|
| CN | 1871562 A | 11/2006 |
| CN | 102237262 A | 11/2011 |
| JP | H07260472 A | 10/1995 |
| WO | WO2009037875 A1 | 3/2009 |

\* cited by examiner

ORTHOGONALITY COMPENSATION METHOD FOR LENGTH MEASUREMENT DEVICE AND LENGTH MEASUREMENT DEVICE USING SAME

BACKGROUND OF THE INVENTION

1. Field of the Invention

The present invention relates to the field of measurement, and in particular to an orthogonality compensation method for length measurement device and a length measurement device using the method.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The operative principle of the liquid crystal panel is that liquid crystal molecules are interposed between two parallel glass substrates and the liquid crystal molecules are controlled to change direction by applying electricity to a circuit of the glass substrates in order to refract out light emitting from the backlight module for generating images.

Referring to FIG. 1, the liquid crystal display panel generally comprises: a TFT (Thin-Film Transistor) substrate 100, a CF (Color Filter) substrate 300 laminated on the TFT substrate 100, and liquid crystal 500 interposed between the TFT substrate 100 and the CF substrate 300. The TFT substrate 100 generally comprises a substrate 102 and a TFT array 104 formed on the substrate 102. The TFT array 104 is formed on the substrate 102 through mask processes. During the fabrication of the TFT array 104, to ensure dimension preciseness of each pixel unit, it is necessary to measure the dimensions of each pixel unit.

Referring to FIGS. 2 and 3, in laminating the TFT substrate 100 and the CF substrate 300, to ensure the accuracy of lamination, it is a common practice to arrange alignment marks on corners of the TFT substrate 100 and the CF substrate 300. Generally, first marks 120 that are cruciform are provided at four corners of the TFT substrate 100 and second marks 320 are arranged at four corresponding corners of the CF substrate 300. Each of the second marks 320 comprises four mark blocks 322. The four mark blocks 322 are symmetric to each other. When the TFT substrate 100 is laminated on the CF substrate 300, the second marks 320 are completely corresponding to the first marks 120. Under this condition, the four mark blocks 322 of each of the second marks 320 are respectively located at four corners of the first mark 120 that corresponds to the second mark 320. In the formation of the first and second marks 120, 320, necessary measurement must be carried out with a length measurement device in order to ensure the accuracy of matching. After the lamination of the TFT substrate 100 and the CF substrate 300, it also needs to carry out inspection with the length measurement device to ensure precise matching between the first and second marks 120, 320.

In summary, it is apparent that the length measurement device plays an important role in the manufacturing process of the liquid crystal display panel and is necessary equipment for the manufacturing of liquid crystal display panels.

Referring to FIG. 4, a conventionally used length measurement device is generally a laser length measurement device, which comprises: a measuring platform 500 and an operation system (not shown) electrically connected to the measuring platform 500. The measuring platform 500 comprises a chassis 502, a table 504 that is mounted on the chassis 502, guide rails 506 that are mounted at opposite sides of the table 504, a cross bar 508 that is slidably mounted on the guide rails 506, an inspection microscope 510 that is slidably mounted on the cross bar 508, and a laser device 512 that is mounted on the chassis 502 and coupled to the inspection microscope 510. To carry out measurement, the operation system controls the measuring platform 500 to read coordinates of two measurement points on an object to be measured (not shown) that is positioned on the table 504. The two sets of coordinates so read are transmitted to the operation system. The operation system performs computations according to the two sets of coordinates in order to determine the length between the measurement points, which will be specifically described as follows:

With reference to FIG. 5, in which X–Y is a measurement coordinate system, Xt–Yt is a coordinate system of the table, and Xc–Yc is a coordinate system of the inspection microscope, the coordinates of a measurement point A are $(X, Y)=(Xt+Xc, Yt+Yc)$.

For a length measurement device that is used in a manufacturing process of liquid crystal display panel, the table 504 comprises a plurality of support pins 542 mounted thereon. A liquid crystal display panel (not shown) is positionable on the support pins 542. Lengthwise direction of the guide rails 506 is taken as the direction of Y-axis and the lengthwise direction of the cross bar 508 is taken as the X direction. Thus, the cross bar 508 must be perpendicular to the guide rails 506. However, in a process of actual measurement, when the cross bar 508 slides with respect to the guide rails 506, variation of orthogonality between the cross bar 508 and the guide rails 506 may occur (see FIG. 6), leading to errors of measurement and thus affecting the subsequent manufacturing operations.

SUMMARY OF THE INVENTION

An object of the present invention is to provide an orthogonality compensation method for length measurement device, which comprises alignment marks provided at four corners of a measuring table of a measuring platform and compares reference coordinates of the alignment marks with measured coordinates to ensure the orthogonality of the measuring platform and thus ensuring accuracy of measurement.

Another object of the present invention is to provide a length measurement device, which comprises alignment marks arranged at four corners of a measuring table to monitor the orthogonality between a cross bar and guide rails so as to ensure accuracy of measurement.

To achieve the objects, the present invention provides an orthogonality compensation method for length measurement device, which comprises the following steps:

(1) providing a measuring platform and a plurality of alignment marks, wherein the measuring platform comprises a chassis, a rectangular measuring table mounted on the chassis, an inspection microscope arranged above the measuring table, and a laser device mounted on the chassis and coupled to the inspection microscope;

(2) mounting the alignment marks on the measuring table and recording the coordinates of the alignment marks with respect to the coordinate system of the measuring table to provide reference coordinates;

(3) using the inspection microscope to read actual coordinates of the alignment marks with respect to the coordinate system of the measuring table and comparing the actual coordinates with the reference coordinates; and (4) carrying out correction of coordinates if differences exist between the actual coordinates and the reference coordinates, so as to make the actual coordinates equal to the reference coordinates.

The alignment marks provided in step (1) are of a number of four and are respectively mounted at four corners of the measuring table.

The measuring platform provided in step (1) further comprises first and second guide rails that are mounted on the measuring table and are respectively located at two opposite sides of the measuring table, a cross bar mounted on the first and second guide rails, and a power system. The cross bar are arranged to be slidable along the first and second guide rails in a lengthwise direction. The inspection microscope is slidably mounted on the cross bar. The power system comprises a plurality of linear motors that respectively drive sliding movement of the cross bar along the first and second guide rails and sliding movement of the inspection microscope along the cross bar.

The measuring table is made of glass and comprises a plurality of holes uniformly distributed thereon. A plurality of support pins respectively extends from the holes to project from the measuring table for supporting thereon a liquid crystal display panel to be measured.

The measuring platform further comprises a stone surface plate mounted on the chassis. The stone surface plate is made of marble. The measuring table is mounted on the stone surface plate.

The measuring platform further comprises a shock absorption device arranged between the chassis and the stone surface plate and an air floating system.

The present invention also provides an orthogonality compensation method for length measurement device, which comprises the following steps:

(1) providing a measuring platform and a plurality of alignment marks, wherein the measuring platform comprises a chassis, a rectangular measuring table mounted on the chassis, an inspection microscope arranged above the measuring table, and a laser device mounted on the chassis and coupled to the inspection microscope;

(2) mounting the alignment marks on the measuring table and recording the coordinates of the alignment marks with respect to the coordinate system of the measuring table to provide reference coordinates;

(3) using the inspection microscope to read actual coordinates of the alignment marks with respect to the coordinate system of the measuring table and comparing the actual coordinates with the reference coordinates; and (4) carrying out correction of coordinates if differences exist between the actual coordinates and the reference coordinates, so as to make the actual coordinates equal to the reference coordinates;

wherein the alignment marks provided in step (1) are of a number of four and are respectively mounted at four corners of the measuring table;

wherein the measuring platform provided in step (1) further comprises first and second guide rails that are mounted on the measuring table and are respectively located at two opposite sides of the measuring table, a cross bar mounted on the first and second guide rails, and a power system, the cross bar being arranged to be slidable along the first and second guide rails in a lengthwise direction, the inspection microscope being slidably mounted on the cross bar, the power system comprising a plurality of linear motors that respectively drive sliding movement of the cross bar along the first and second guide rails and sliding movement of the inspection microscope along the cross bar;

wherein the measuring table is made of glass and comprises a plurality of holes uniformly distributed thereon, a plurality of support pins respectively extending from the holes to project from the measuring table for supporting thereon a liquid crystal display panel to be measured;

wherein the measuring platform further comprises a stone surface plate mounted on the chassis, the stone surface plate being made of marble, the measuring table being mounted on the stone surface plate; and wherein the measuring platform further comprises a shock absorption device arranged between the chassis and the stone surface plate and an air floating system.

The present invention further provides a length measurement device, which comprises: a measuring platform and four alignment marks arranged on the measuring platform, the measuring platform comprising a chassis, a rectangular measuring table mounted on the chassis, an inspection microscope arranged above the measuring table, and a laser device mounted on the chassis and coupled to the inspection microscope. The alignment marks are respectively mounted to four corners of the measuring table.

The measuring platform further comprises first and second guide rails that are mounted on the measuring table and are respectively located at two opposite sides of the measuring table, a cross bar mounted on the first and second guide rails, and a power system. The cross bar is arranged to be slidable along the first and second guide rails in a lengthwise direction. The inspection microscope is slidably mounted on the cross bar. The power system comprising a plurality of linear motors that respectively drive sliding movement of the cross bar along the first and second guide rails and sliding movement of the inspection microscope along the cross bar.

The measuring table is made of glass and comprises a plurality of holes uniformly distributed thereon. A plurality of support pins respectively extends from the holes to project from the measuring table for supporting thereon a liquid crystal display panel to be measured.

The measuring platform further a stone surface plate mounted on the chassis, a shock absorption device arranged between the chassis and the stone surface plate, and an air floating system. The stone surface plate is made of marble. The measuring table is mounted on the stone surface plate.

The efficacy of the present invention is that the present invention provides an orthogonality compensation method for length measurement device and a length measurement device using same, wherein alignment marks are provided on the measuring table and the coordinates of the alignment marks are first read before measurement is carried out in order to compare the coordinates with the coordinates that are set for the alignment marks so that correction can be automatically done with variation occurs to ensure the orthogonality between X-axis and Y-axis and thus ensuring accuracy of measurement.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
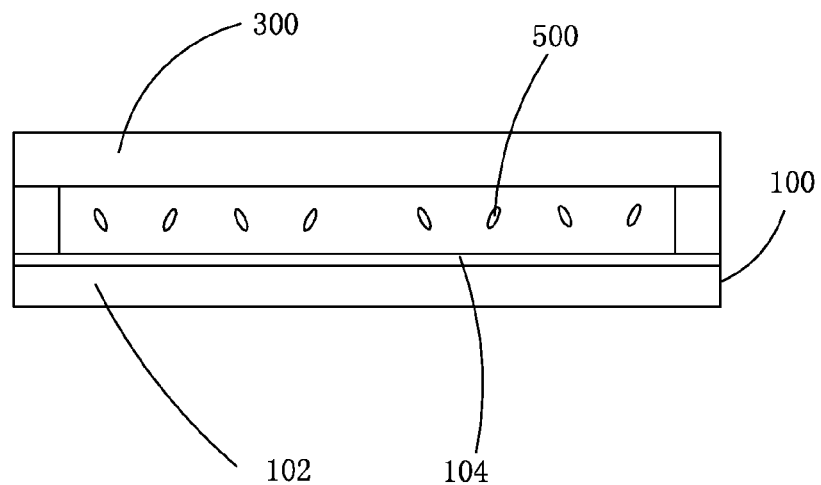
FIG. 1 is a schematic view showing a liquid crystal display panel.
Figure 2:
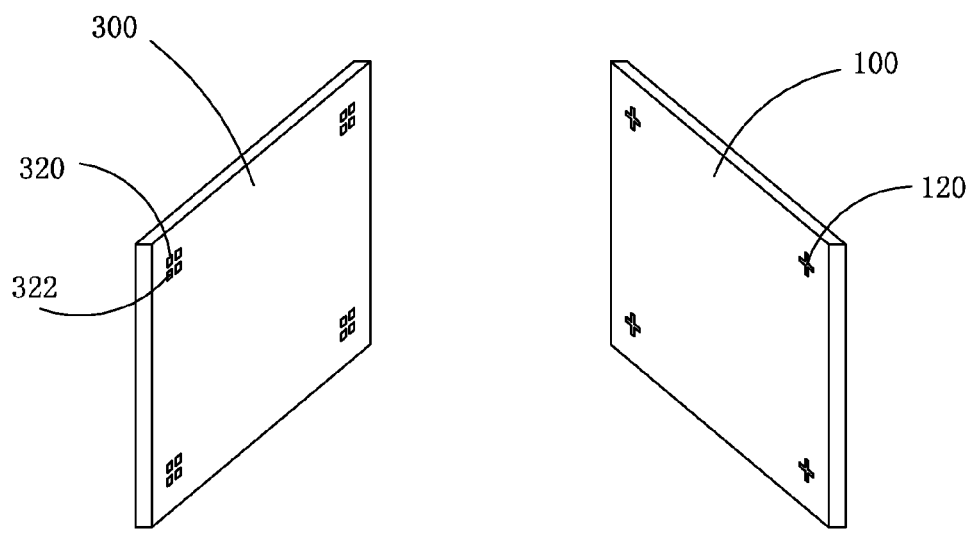
FIG. 2 is an exploded view of a TFT substrate and a CF substrate.
Figure 3:
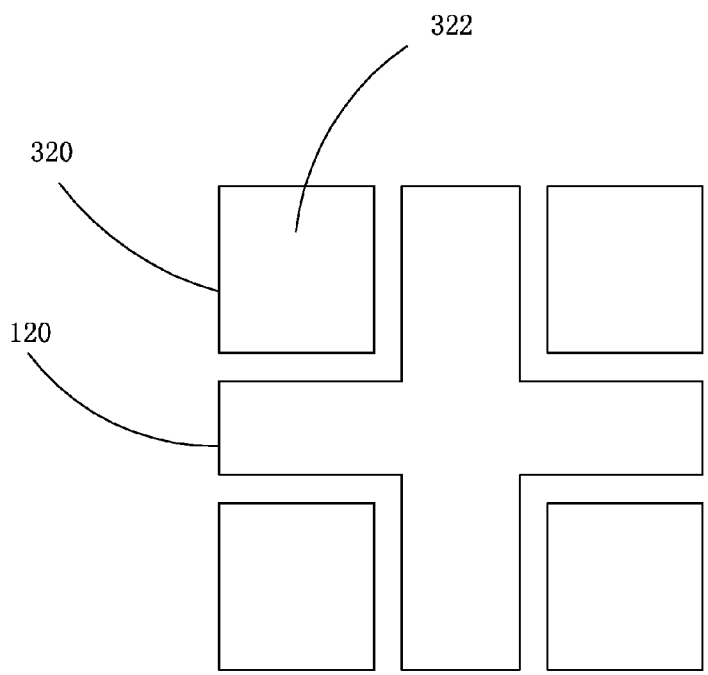
FIG. 3 is a schematic view illustrating matching between a first mark of the TFT substrate and a second mark of the CF substrate.
Figure 4:
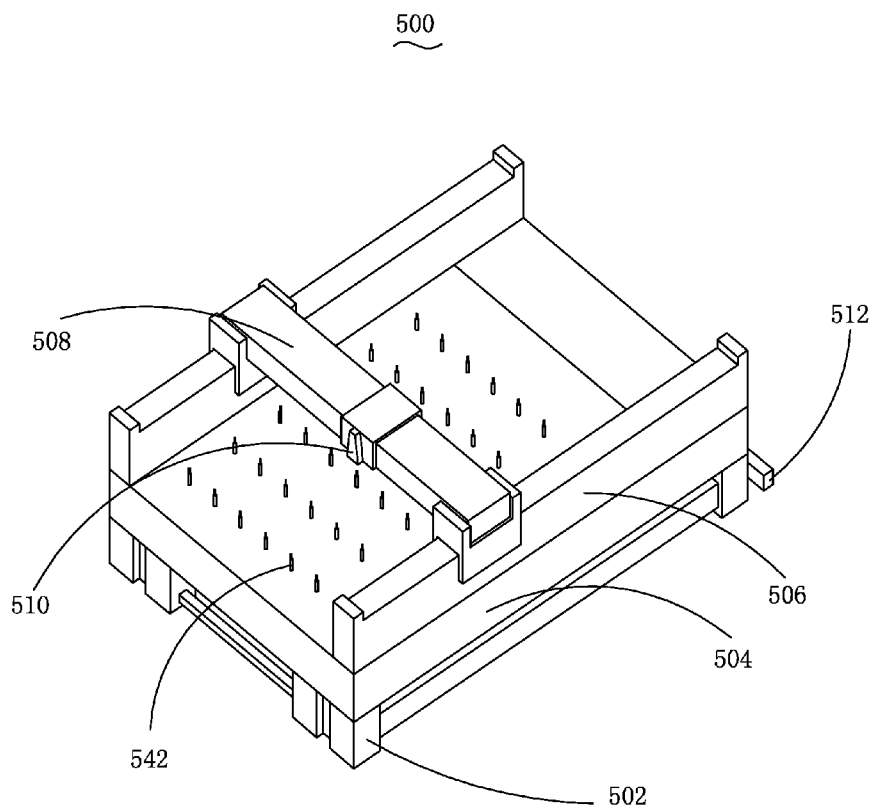
FIG. 4 is schematic view illustrating a conventional length measurement device.
Figure 5:
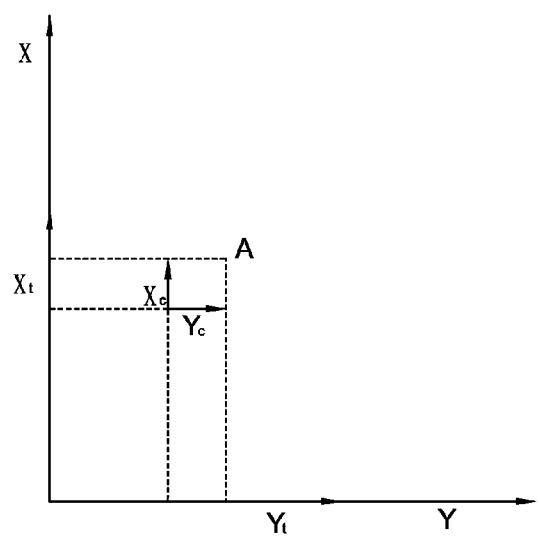
FIG. 5 is a view illustrating the principle of coordinate measurement carried out with the length measurement device.
Figure 6:
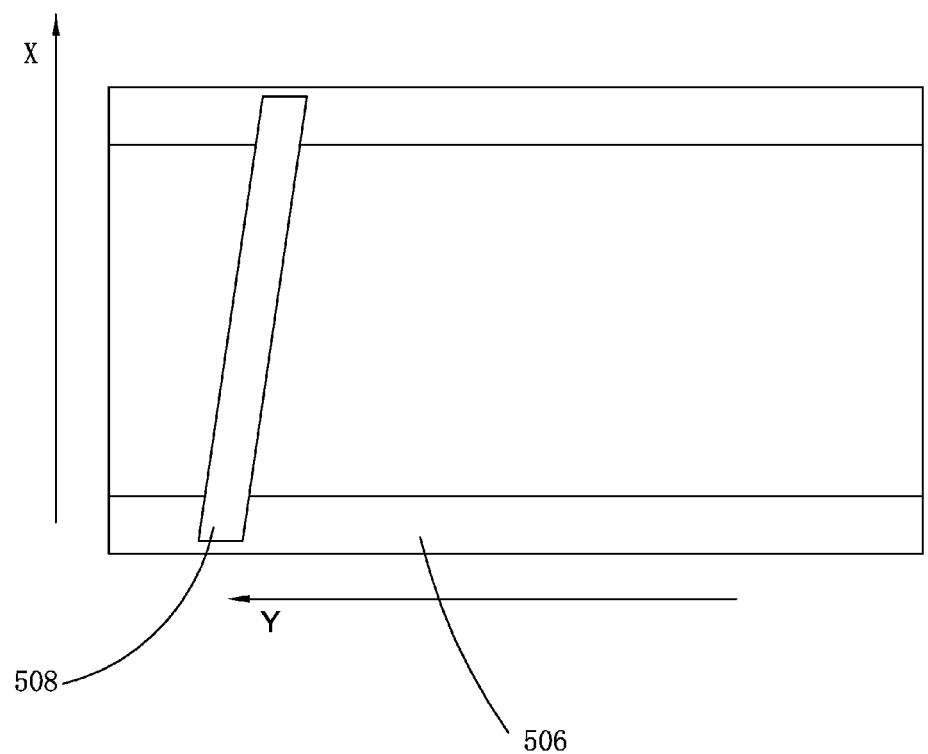
FIG. 6 is a top plan view showing variation of orthogonality occurring in the length measurement device.
Figure 7:
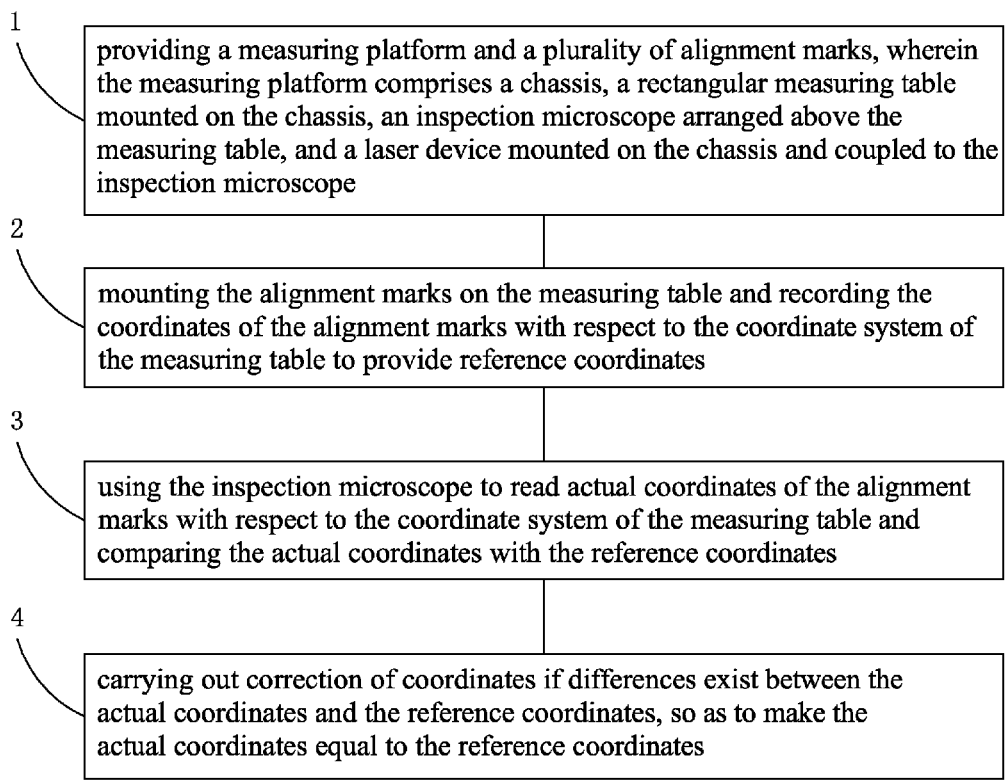
FIG. 7 is a flow chart illustrating an orthogonality compensation method for length measurement device according to the present invention.
Figure 8:
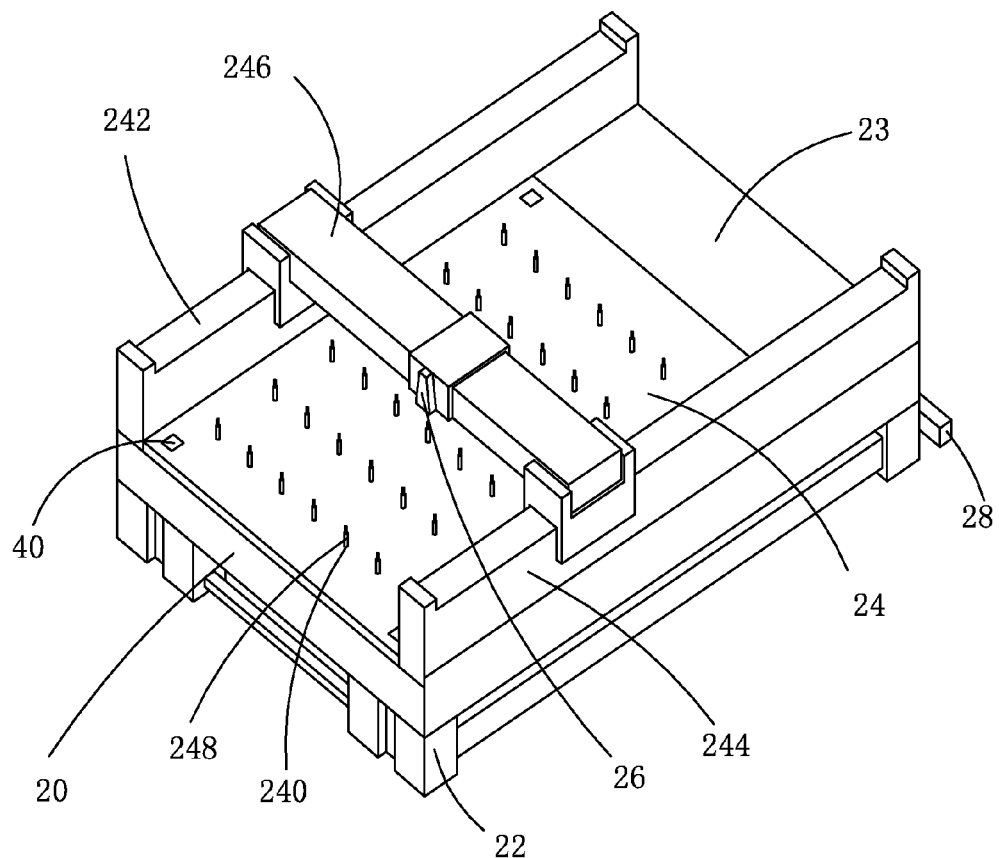
FIG. 8 is a schematic view showing a length measurement device according to the present invention.
Figure 9:
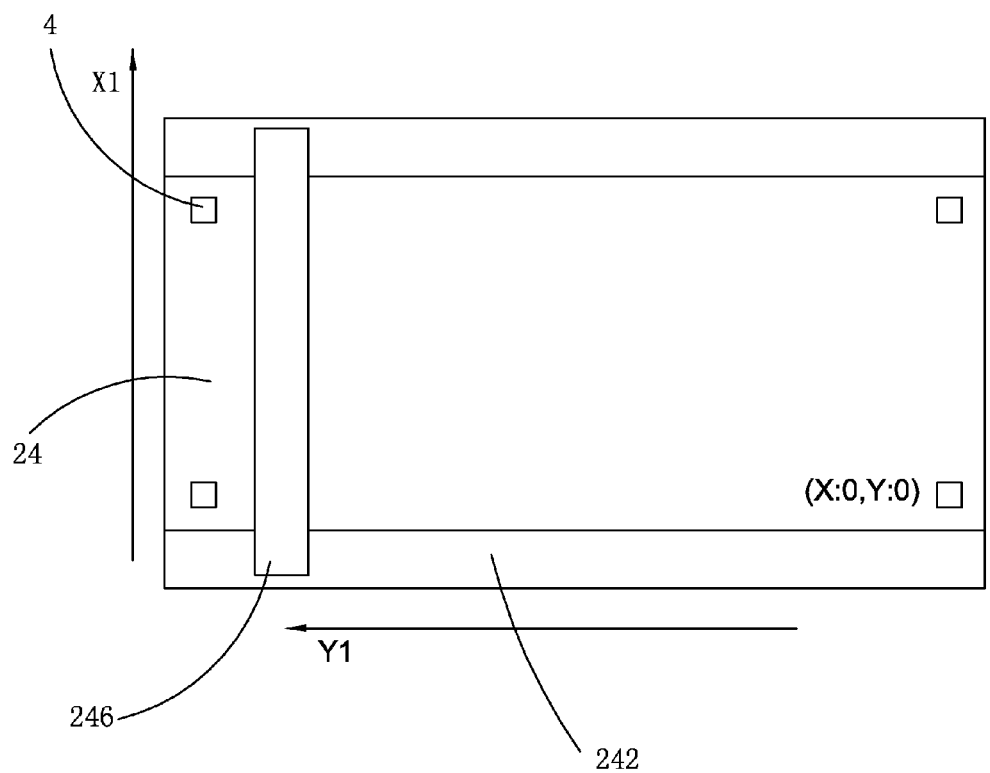
FIG. 9 is a top plan of the length measurement device according to the present invention.

Referring to FIGS. 7-9, the present invention provides an orthogonality compensation method for length measurement device, which comprises the following steps:

Step 1: providing a measuring platform 20 and a plurality of alignment marks 40, wherein the measuring platform 20 comprises a chassis 22, a rectangular measuring table 24 mounted on the chassis 22, an inspection microscope 26 arranged above the measuring table 24, and a laser device 28 mounted on the chassis 22 and coupled to the inspection microscope 26.

The measuring platform 20 further comprises first and second guide rails 242, 244 that are mounted on the measuring table 24 and are respectively located at two opposite sides of the measuring table 24 and a cross bar 246 mounted on the first and second guide rails 242, 244. The cross bar 246 is arranged to be slidable along the first and second guide rails 242, 244 in a lengthwise direction. The inspection microscope 26 is slidably mounted on the cross bar 246, whereby the inspection microscope 26 is slidable in the lengthwise direction of the first and second guide rails 242, 244 and a lengthwise direction of the cross bar 246 to provide an X1 axis and an Y1 axis of a measurement coordinate system. Preferably, the measurement coordinate system so formed is coincident with a coordinate system of the measuring table, wherein the lengthwise direction of the first and second guide rails 242, 244 is the direction of Y1 axis of the measurement coordinate system and the lengthwise direction of the cross bar 246 is the direction of X1 axis of the measurement coordinate system.

In the instant embodiment, the measuring table 24 is made of glass and comprises a plurality of holes 240 uniformly distributed thereon. A plurality of support pins 248 respectively extends from the holes 240 to project from the measuring table 24 for supporting thereon a liquid crystal display panel to be measured (not shown).

The measuring platform 20 further comprises a stone surface plate 23 mounted on the chassis 22. The measuring table 24 is mounted on the stone surface plate 23. In the instant embodiment, the stone surface plate 23 is made of marble that provides excellent flatness, is not easily deformable, and facilitates to ensure stability of precise measurement.

It is noted that the measuring platform 20 further comprises a shock absorption device (not shown) arranged between the chassis 22 and the stone surface plate 23 to cushion external forces and thus ensure preciseness of measurement.

The measuring platform 20 further comprises an air floating system (not shown) and a power system (not shown). The air floating system functions to float the cross bar 246 and the inspection microscope 26 in order to reduce the friction between the cross bar 246 and the first and second guide rails 242, 244 and the friction between the inspection microscope 26 and the floating cross bar 246. The power system comprises a plurality of linear motors that respectively drives sliding movement of the cross bar 246 along the first and second guide rails 242, 244 and that of the inspection microscope 26 along the cross bar 246.

Specific structures of the air floating system and the power system can be realized with known technology and further description will not be given herein.

Step 2: mounting the alignment marks 40 on the measuring table 24 and recording the coordinates of the alignment marks with respect to the coordinate system of the measuring table to provide reference coordinates.

In the instant embodiment, the alignment marks 40 are of a number of four and are respectively mounted at four corners of the measuring table 24. Preferably, the coordinates of one of the alignment marks are set to be (X1:0, Y1:0).

Step 3: using the inspection microscope 26 to read actual coordinates of the alignment marks 40 with respect to the coordinate system of the measuring table and comparing the actual coordinates with the reference coordinates.

Step 4: carrying out correction of coordinates if differences exist between the actual coordinates and the reference coordinates, so as to make the actual coordinates equal to the reference coordinates.

Taking an alignment mark (X1:0, Y1:0) as an example, a difference is present between the actual coordinates (X1:0, Y1:3) and the reference coordinates (X1:0, Y1:0). Correction is thus made on the actual coordinates (X1:0, Y1:3) to make the actual coordinates (X1:0, Y1:3) equal to the reference coordinates (X1:0, Y1:0) in order to ensure preciseness of measurement.

Referring to FIGS. 8 and 9, the present invention further provides a length measurement device, which comprises: a measuring platform 20 and four alignment marks 40 arranged on the measuring platform 20. The measuring platform 20 comprises a chassis 22, a rectangular measuring table 24 mounted on the chassis 22, an inspection microscope 26 arranged above the measuring table 24, and a laser device 28 mounted on the chassis 22 and coupled to the inspection microscope 26.

The measuring platform 20 further comprises first and second guide rails 242, 244 that are mounted on the measuring table 24 and are respectively located at two opposite sides of the measuring table 24 and a cross bar 246 mounted on the first and second guide rails 242, 244. The cross bar 246 is arranged to be slidable along the first and second guide rails 242, 244 in a lengthwise direction. The inspection microscope 26 is slidably mounted on the cross bar 246, whereby the inspection microscope 26 is slidable in the lengthwise direction of the first and second guide rails 242, 244 and a lengthwise direction of the cross bar 246 to provide an X1 axis and an Y1 axis of a measurement coordinate system. Preferably, the measurement coordinate system so formed is coincident with a coordinate system of the measuring table, wherein the lengthwise direction of the first and second guide rails 242, 244 is the direction of Y1 axis of the measurement coordinate system Y1 and the lengthwise direction of the cross bar 246 is the direction of X1 axis of the measurement coordinate system.

In the instant embodiment, the measuring table 24 is made of glass and comprises a plurality of holes 240 uniformly distributed thereon. A plurality of support pins 248 respectively extends from the holes 240 to project from the measuring table 24 for supporting thereon a liquid crystal display panel to be measured (not shown).

The measuring platform 20 further comprises a stone surface plate 23 mounted on the chassis 22. The measuring table 24 is mounted on the stone surface plate 23. In the instant embodiment, the stone surface plate 23 is made of marble that provides excellent flatness, is not easily deformable, and facilitates to ensure stability of precise measurement.

It is noted that the measuring platform 20 further comprises a shock absorption device (not shown) arranged between the chassis 22 and the stone surface plate 23 to cushion external forces and thus ensure preciseness of measurement.

The measuring platform 20 further comprises an air floating system (not shown) and a power system (not shown). The air floating system functions to float the cross bar 246 and the inspection microscope 26 in order to reduce the friction between the cross bar 246 and the first and second guide rails 242, 244 and the friction between the inspection microscope 26 and the floating cross bar 246. The power system comprises a plurality of linear motors that respectively drives sliding movement of the cross bar 246 along the first and second guide rails 242, 244 and that of the inspection microscope 26 along the cross bar 246.

Specific structures of the air floating system and the power system can be realized with known technology and further description will not be given herein.

In summary, the present invention provides an orthogonality compensation method for length measurement device and a length measurement device using same, wherein alignment marks are provided on the measuring table and the coordinates of the alignment marks are first read before measurement is carried out in order to compare the coordinates with the coordinates that are set for the alignment marks so that correction can be automatically done with variation occurs to ensure the orthogonality between X-axis and Y-axis and thus ensuring accuracy of measurement.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An orthogonality compensation method for length measurement device, comprising the following steps:
   (1) providing a measuring platform and a plurality of alignment marks, wherein the measuring platform comprises a fixed chassis, a rectangular measuring table mounted on the chassis and thus fixed, an inspection microscope arranged above the measuring table, a laser device mounted on the chassis and coupled to the inspection microscope, first and second guide rails that are mounted on the measuring table and are respectively located at two opposite sides of the measuring table so that a top surface of the measuring table is located between the first and second guide rails, and a cross bar movably mounted on and extending between the first and second guide rails to be located above the top surface of the measuring table, the inspection microscope being slidably mounted on the cross bar and thus located above the top surface of the measuring table;
   (2) mounting the alignment marks on the top surface of the measuring table and recording the coordinates of the alignment marks with respect to the coordinate system of the measuring table to provide reference coordinates;
   (3) using the inspection microscope through movement of the cross bar along the first and second guide rails and sliding motion of the inspection microscope along the cross bar to read actual coordinates of the alignment marks with respect to the coordinate system of the measuring table and comparing the actual coordinates with the reference coordinates; and
   (4) carrying out correction of coordinates if differences exist between the actual coordinates and the reference coordinates, so as to directly correct the actual coordinates to be equal to the reference coordinates through compensation with the differences without movement of the measuring table.

2. The orthogonality compensation method for length measurement device as claimed in claim 1, wherein the alignment marks provided in step (1) are of a number of four and are respectively mounted at four corners of the measuring table.

3. The orthogonality compensation method for length measurement device claimed in claim 1, wherein the measuring platform provided in step (1) further comprises a power system, the power system comprising a plurality of linear motors that respectively drive the movement of the cross bar along the first and second guide rails and the sliding motion of the inspection microscope along the cross bar.

4. The orthogonality compensation method for length measurement device claimed in claim 1, wherein the measuring table is made of glass and comprises a plurality of holes uniformly distributed thereon, a plurality of support pins respectively extending from the holes to project from the measuring table for supporting thereon a liquid crystal display panel to be measured.

5. The orthogonality compensation method for length measurement device claimed in claim 1, wherein the measuring platform further comprises a stone surface plate mounted on the chassis, the stone surface plate being made of marble, the measuring table being mounted on the stone surface plate.

6. The orthogonality compensation method for length measurement device claimed in claim 1, wherein the measuring platform further comprises a shock absorption device arranged between the chassis and the stone surface plate and an air floating system.

7. An orthogonality compensation method for length measurement device, comprising the following steps:
   (1) providing a measuring platform and a plurality of alignment marks, wherein the measuring platform comprises a fixed chassis, a rectangular measuring table mounted on the chassis and thus fixed, an inspection microscope arranged above the measuring table, and a laser device mounted on the chassis and coupled to the inspection microscope, first and second guide rails that are mounted on the measuring table and are respectively located at two opposite sides of the measuring table so that a top surface of the measuring table is located between the first and second guide rails, and a cross bar movably mounted on and extending between the first and second guide rails to be located above the top surface of the measuring table, the inspection microscope being slidably mounted on the cross bar and thus located above the top surface of the measuring table;
   (2) mounting the alignment marks on the top surface of the measuring table and recording the coordinates of the alignment marks with respect to the coordinate system of the measuring table to provide reference coordinates;

(3) using the inspection microscope through movement of the cross bar along the first and second guide rails and sliding motion of the inspection microscope along the cross bar to read actual coordinates of the alignment marks with respect to the coordinate system of the measuring table and comparing the actual coordinates with the reference coordinates; and (4) carrying out correction of coordinates if differences exist between the actual coordinates and the reference coordinates, so as to directly correct the actual coordinates to be equal to the reference coordinates through compensation with the differences without movement of the measuring table;

wherein in step (1), the alignment marks provided are of a number of four and are respectively mounted at four corners of the measuring table;

wherein in step (1), the measuring platform provided further comprises a power system, the power system comprising a plurality of linear motors that respectively drive the movement of the cross bar along the first and second guide rails and the sliding motion of the inspection microscope along the cross bar;

wherein the measuring table is made of glass and comprises a plurality of holes uniformly distributed thereon, a plurality of support pins respectively extending from the holes to project from the measuring table for supporting thereon a liquid crystal display panel to be measured;

wherein the measuring platform further comprises a stone surface plate mounted on the chassis, the stone surface plate being made of marble, the measuring table being mounted on the stone surface plate; and wherein the measuring platform further comprises a shock absorption device arranged between the chassis and the stone surface plate and an air floating system.

8. A length measurement device, comprising: a measuring platform having a top surface and four alignment marks arranged on the top surface of the measuring platform, the measuring platform comprising a fixed chassis, a rectangular measuring table mounted on the chassis and thus fixed, an inspection microscope arranged above the measuring table, a laser device mounted on the chassis and coupled to the inspection microscope, first and second guide rails that are mounted on the measuring table and are respectively located at two opposite sides of the measuring table so that the top surface of the measuring table is located between the first and second guide rails, and a cross bar movably mounted on and extending between the first and second guide rails to be located above the top surface of the measuring table, the inspection microscope being slidably mounted on the cross bar and thus located above the top surface of the measuring table so that the inspection microscope is operable through movement of the cross bar along the first and second guide rails and sliding motion of the inspection microscope along the cross bar to read actual coordinates of the alignment marks with respect to the coordinate system of the measuring table, the alignment marks being respectively mounted to four corners of the measuring table at predetermined reference coordinates, wherein differences between the actual coordinates and the reference coordinates are applied to carry out compensation of coordinates in such a way that the actual coordinates are directly corrected to be equal to the reference coordinates without movement of the measuring table.

9. The length measurement device as claimed in claim 8, wherein the measuring platform further comprises a power system, the power system comprising a plurality of linear motors that respectively drive the movement of the cross bar along the first and second guide rails and the sliding motion of the inspection microscope along the cross bar.

10. The length measurement device as claimed in claim 8, wherein the measuring table is made of glass and comprises a plurality of holes uniformly distributed thereon, a plurality of support pins respectively extending from the holes to project from the measuring table for supporting thereon a liquid crystal display panel to be measured.

11. The length measurement device as claimed in claim 8, wherein the measuring platform further a stone surface plate mounted on the chassis, a shock absorption device arranged between the chassis and the stone surface plate, and an air floating system, the stone surface plate being made of marble, the measuring table being mounted on the stone surface plate.

* * * * *